United States Patent [19]

Matsushige

[11] Patent Number: 5,231,544
[45] Date of Patent: Jul. 27, 1993

[54] METHOD AND APPARATUS FOR SIGNAL DETECTION IN A MAGNETIC RECORDING AND REPRODUCING APPARATUS

[75] Inventor: Hiromi Matsushige, Odawara, Japan

[73] Assignee: Hitachi, Ltd., Tokyo, Japan

[21] Appl. No.: 646,670

[22] Filed: Jan. 28, 1991

[30] Foreign Application Priority Data

Jan. 29, 1990 [JP] Japan .................................. 2-016256
Sep. 14, 1990 [JP] Japan .................................. 2-242325

[51] Int. Cl.$^5$ .............................................. G11B 5/09
[52] U.S. Cl. ........................................ 360/46; 360/51; 360/40
[58] Field of Search .................. 360/46, 51, 40, 48, 360/67, 53, 66, 61, 39; 375/27, 34, 119

[56] References Cited

U.S. PATENT DOCUMENTS 4,571,575 2/1986 McCullough .................... 360/51 X
4,667,318 5/1987 Sugiyama et al. .............. 360/51 X
5,089,821 2/1992 Mori ................................ 360/53 X

FOREIGN PATENT DOCUMENTS 60-28460 4/1985 Japan .

Primary Examiner—Robert J. Pascal
Assistant Examiner—Ali Neyzari
Attorney, Agent, or Firm—Kenyon & Kenyon

[57] ABSTRACT

A signal detection circuit of a magnetic recording and reproducing apparatus generates a clock signal synchronized with peaks of a reproduced signal read from a magnetic recording medium on which data have been recorded by a (d, k) run-length code, and determines "1" or "0" with respect to a discrimination threshold based on an absolute value of a peak of the reproduced waveform at a timing synchronized with the clock signal. The signal detection circuit comprises a quantizer for quantizing the reproduced signal in synchronism with the clock signal to produce a quantized signal, a multi-stage shift register for delaying the clock signal in synchronism with the clock signal, and threshold generation means for comparing the quantized signal supplied from the final stage of the multi-stage shift register and the quantized signal representing the current threshold to dynamically generate a new relevant threshold in accordance with the difference in the comparison.

6 Claims, 9 Drawing Sheets (DETECTION OF "11" PATTERN)

(DETECTION OF "101" PATTERN)

(DETECTION OF "1001" PATTERN)

(DETECTION OF "10001" PATTERN)

METHOD AND APPARATUS FOR SIGNAL DETECTION IN A MAGNETIC RECORDING AND REPRODUCING APPARATUS

BACKGROUND OF THE INVENTION

The present invention relates to a signal detection circuit in a recording and reproducing apparatus which uses a recording medium such as a magnetic tape or a magnetic disk, and more particularly, to a signal detection method and apparatus for a digital data recording and reproducing apparatus which is suitable to detect a high-density recorded signal without error.

In a prior art signal detection circuit for the magnetic recording and reproducing apparatus, data is reproduced by detecting a peak of a magnetic head output waveform. However, data is sprung out or lost by noise and undershoot included in the output waveform. This lowers the reliability of information.

In order to solve the above problem, the following four conditions have been proposed as discrimination conditions for an effective peak, as disclosed in JP-B-60-28460: (1) a detected signal pulse must have a proper polarity and successive Pulses must have polarities thereof reversed; (2) a signal amplitude must exceed a predetermined threshold level; (3) a point at which a polarity of gradient of the signal changes, that is, a peak point must be detected; (4) a voltage change from a maximum amplitude point or the peak point must be the reduction by a predetermined voltage $\Delta V$ before a predetermined delay time elapses. When those four conditions are simultaneously met, an effective peak is detected.

FIG. 4 shows a reproduced waveform in which a waveform peak appears at a point other than record data of a logical level "1" or data which is to be data of the logical level "1" has been lost because of a noise included in the reproduced waveform due to a read circuit or a head, or a noise due to a medium defect. Numerals shown over times (n−2) to (n+13) are values sampled by a clock which are synchronized with the peak position of the reproduced waveform. In a signal detection in which a bit-by-bit signal detection by a prior art method is effected to the reproduced waveform, correct signal detection is not attained for the reproduced waveform which has been dynamically changed by data bit length, a so-called "sprung out" waveform in which the recording medium defect, the noise or an invalid peak portion of a threshold value "0" in the transition between data bits fully exceeds the threshold level (a noise sprung-out waveform in which a gradient of the waveform exceeds a predetermined monitoring voltage $\Delta V$), and a lost waveform in which effective data does not exceed the threshold level because of drop-out.

For example, where the reproduced waveform shown in FIG. 4 is detected by the prior art method, the peak values at the times n and (n+2) are lower than the threshold level and they are erroneously detected as the logical level "0" although they are to be detected as the logical level "1". Further, the peak values at the times (n+5) and (n+10) fully exceed the threshold level and they are erroneously detected as the logical level "1" although they are to be detected as the logical level "0". Accordingly, in the reproduction of the high recording density data, the correct data signal detection is not attained.

JP-A-64-86373 discloses an error pointer signal generator which generates an error pointer when a waveform which appears immediately following to a signal to be detected exceeds a predetermined level and is of the same polarity.

SUMMARY OF THE INVENTION

It is an object of the present invention to provide a signal detection method and circuit for a data recording and reproducing apparatus which results in maintaining a high signal detection performance for a sprung-out waveform in which a pseudo peak fully exceeds a threshold level due to noise, undershoot or medium defect, and a lost waveform in which the effective peak does not exceed the threshold level.

Another object of the present invention is to provide a pointer signal generator of a data reproducing apparatus for generating an error pointer to correctly indicate the presence of a data detection error for expanding an error correction capability.

The signal detection circuit in the data recording and reproducing apparatus of the present invention generates a clock signal synchronized with a peak of a reproduced signal read from a data recording medium, and determines "1" or "0" level from an absolute value of the peak of the reproduced waveform at a timing synchronized with the clock signal.

The signal detection circuit in accordance with another feature of the present invention comprises quantity means for quantizing the reproduced signal in synchronism with the clock signal to produce a quantized signal, a multi-stage shift register for delaying the quantized signal in synchronism with the clock signal, reference generation means for comparing the quantized signal supplied from a final stage of the shift register and the quantized signal representing a current reference, and outputting the quantized signal supplied from the final stage of the shift register as a new reference when the quantized signal supplied from the final stage of the shift register is larger than the quantized signal representing the current reference, and maintaining the current reference when the quantized signal supplied from the final stage of the shift register is smaller than the quantized signal representing the current reference, operation means for adding the reference to the quantized signal supplied from the final stage of the shift register and subtracting the quantized signal supplied from the final stage of the shift register from the reference, and detection means for comparing the quantized signals supplied from the respective stages of the shift register and the two quantized signals supplied from the operation means in accordance with a detection logic for a data pattern "1" based on a (d, k) run-length code and detecting "1" in accordance with the detection logic for the data pattern "1" based on the (d, k) run-length code and the result of comparison.

In accordance with the above arrangement, the reference is dynamically changed in accordance with the previous value of the detection signal from the medium by the reference generation means, and the detection means detects "1" in accordance with the outputs of the operation means and the shift register and the "1" detection logic of the (d, k) run-length code. As a result, even if the reproduced waveform includes a pseudo peak or the effective peak does not exceed the threshold, the correct signal detection is attained.

In order to discriminate the effective signal peak from the pseudo peak, the signal detection circuit of the present invention uses a first algorithm for searching a peak which exceeds a positive reference and a second signal detection algorithm for searching a peak which exceeds a negative reference. In another aspect, a third signal detection algorithm for searching a reference at a zero-crossing point may be additionally used. The first and second signal detection algorithms detect the effective peak by using the following property of a sequential signal.

(1) If a positive or negative amplitude of the read signal is larger than a reference A, it is determined as the data "1".

(2) If the amplitude is smaller than the reference, it is possible that a noise at a "0" area has sprung out, or the signal "1" has been lost. It is determined from a relation with preceding or succeeding bit.

(3) The appearance of "1" is restricted by the (d, k) run-length code. For example, the data patterns in the (0, 3) run-length code are four, "11", "101", "1001" and "10001". Thus, the test is limited to the four patterns. In the present invention, the effective peak is discriminated from the noise by using such a property of the magnetic recording.

The reference to detect the signal is generated by using the peak level of the reproduced signal to be detected, and the reference for detecting the signal is automatically controlled in proportion to the change in the amplitude of the reproduced signal, that is, the change in the peak of the full-wave rectified reproduced signal for each predetermined period.

A principle of operation and a general operation of the signal detection in the present invention are now explained with reference to a reproduced wavelength of the (0, 3) run-length code shown in FIG. 4. In FIG. 4, the reproduced waveform includes effective peaks as well as noises, undershoots and other noises due to the medium defect. In FIG. 4, broken lines in waveforms (a), (b) and (c) represent a proper reproduced waveform. Solid lines in the waveforms (a), (b) and (c) represent effective peaks (n, n+2) which are below the threshold level due to the medium defect and ineffective peaks (n+5, n+10) due to the noise or the undershoot. The signal detection circuit is configured to attain the signal detection with high reliability to such loss of the effective peak and the spring-out of the pseudo peak by the noise.

The signal detection algorithm of the present invention utilizes the property of the specific record such as magnetic record in which the effective peaks appear alternately in the reproduced waveform and the generation patterns of the bit sequence are restricted by the (d, k) run-length code, and the effective peak is discriminated from the noise by the relationship of the bit to be detected with the preceding or succeeding bit. Specifically, the reproduced waveform shown in FIG. 4 is discriminated as follows. (1) The first bit (time n−2) has a large positive amplitude and it is determined as the signal "1". (2) The next bit (time n−1) has a large negative amplitude and it is determined as the signal "1". (3) The next bit (time n, waveform a) has a small positive amplitude and the succeeding bit (time n+1) has a larger negative amplitude than the reference level, and it is determined as the signal "1". (4) The next bit (time n+1) has a large negative amplitude and it is determined as the signal "1". (5) The next bit (time n+2) has a small positive amplitude but the bit at the time n+4 has a larger negative amplitude than the reference level, and it is determined as the signal "1". (6) The bit at the time n+4 has a larger negative amplitude than the threshold level and it is determined as the signal "1". (7) The next bit (time n+5, waveform b) has a large positive amplitude and is of the opposite polarity to the preceding bit but the bit at the time n+8 is of the same polarity and has a larger amplitude than the waveform b, and it is determined as a noise. (8) The next bit (time n+8) has a large positive amplitude and the succeeding bit (time n+9) has a large negative amplitude, and it is determined as the signal "1". (9) The next bit (time n+9) has a large positive amplitude and it is determined as the signal "1". (10) The next bit (time n+10, waveform c) has a large positive amplitude and is of the opposite polarity to the preceding bit but the bit at the time n+12 is of the same polarity and has a larger amplitude than the waveform c, and it is determined as a noise and hence as the signal "0". The bits at the times n+3 and n+5 to n+7 in FIG. 4 do not meet the "1" detection logic and they are determined as the signal "0".

In the signal detection circuit of the present invention, the peaks of the opposite polarities alternately appear for "1" in the record data. The generation patterns of the bit sequence are restricted by the (d, k) run-length code. For example, in the (0, 3) code, the consecutive "0"s are limited to three bits. Namely, "1" bit always appears in four bits. Accordingly, the bits to be tested are limited to four bits. The signal is discriminated from the noise by using such a property of the magnetic recording. Thus, the correct read data is produced for the lost waveform in which the effective peak waveform is smaller than the threshold level and the spring-out waveform in which the signal fully exceeds the threshold level in the prior art signal detection method by the bit-by-bit detection.

In the error pointer generator in accordance with other respect of the present invention, an error pointer signal generating system comprises first detection means including a first threshold level Ad corresponding to an absolute value of a reproduced analog signal amplitude, and a positive detection algorithm for determining that when a sum of absolute values of an amplitude of a positive reproduced analog signal to be determined and a succeeding negative reproduced analog signal amplitude level in succeeding time series restricted by a (d, k) run-length code exceeds the first threshold level Ad, a theoretical level "1" of reproduced signal data is established, and a negative detection algorithm for determining that when a sum of obsolute values of a negative reproduced analog signal amplitude to be determined and a succeeding positive reproduced analog signal amplitude level in succeeding time series restricted by the (d, k) run-length code exceeds the first threshold, a theoretical level "1" of signal data is established; second detection means including a second threshold level Ap higher than the first threshold level Ad and positive and negative reproduced signal detection algorithms for determining that a theoretical level "1" of signal data is established using the second threshold level Ap in a similar manner to the first detection means; first logic means for generating a pointer indicative of negating the detection of reproduced signal when the output of the first detection means does not match the output of the second detection means; a flip-flop which is reset at a detection timing of the positive signal detection algorithm and set at a detection timing of the negative signal detection algorithm; reference clock generation means synchronized with the peak of the analog reproduced signal; and second logic means for checking by the reference clock the number of consecutive "0"s when the output of the flip-flop is positive, to generate a second pointer indicating that there are consecutive theoretical levels "0" larger than the number defined by the (d, k) run-length code.

The above-mentioned pointer generating system is suitably applied to the case where a very high probability is encountered to a theoretical value "1" in the reproduced signal determined by the first signal detection means because of the fact that the sum of absolute values of the positive and negative reproduced analog signal amplitudes exceeds the first threshold due to the noise or dropout, or the case where a theoretical value "1" is erroneously determined because of the fact that the above-mentioned sum exceeds the first threshold due to an invalid pseudo-activity. For such cases, the relation between the outputs of the first signal detection means and the second signal detection means is checked or monitored, and thereby, the first logic means generates the first pointer signal indicating whether the first detected signal is correct or not and the second logic means generates the second pointer signal indicating that the reproduced signal contain consecutive theoretical "0"s greater than the number defined by a (d, k) run-length code by checking by clock signals the number of theoretical "0"s due to the fact that the sum of the absolute values of the valid positive and negative reproduced analog signal amplitudes does not exceeds the first threshold. As a result, the capability of error correction algorithm is expanded.

DETAILED DESCRIPTION OF THE PREFERRED EMBODIMENTS

Preferred embodiments of the present invention will now be explained in detail with reference to the accompanying drawings.

Figure 2A:
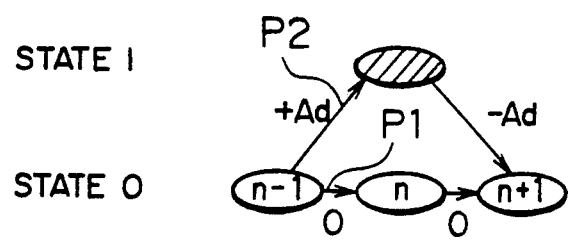
FIGS. 2A to 2D show grid charts of a signal detection algorithm used in the embodiment of FIG. 1.
Figure 2B:
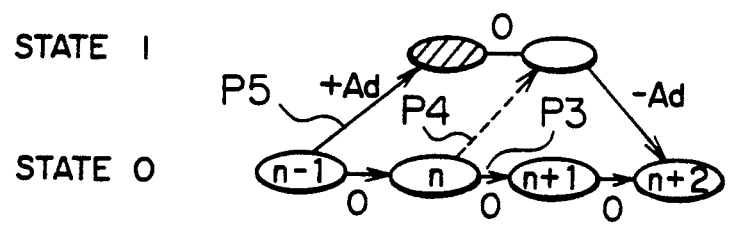
Figure 2C:
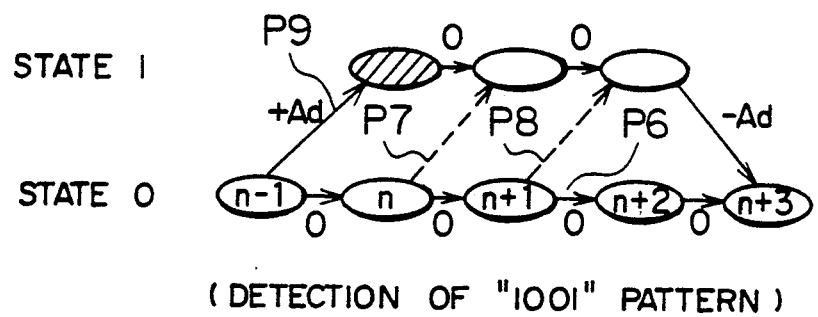
Figure 2D:
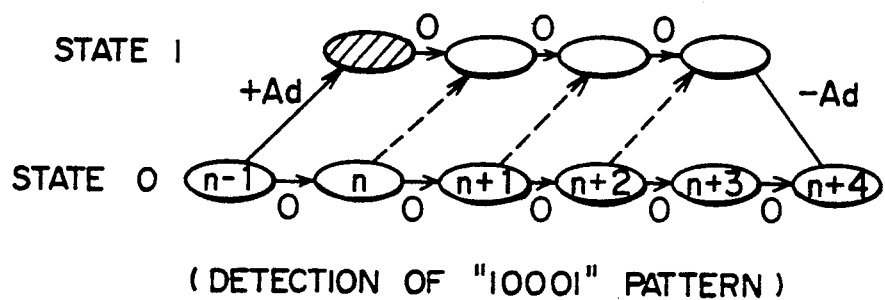
Figure 3:
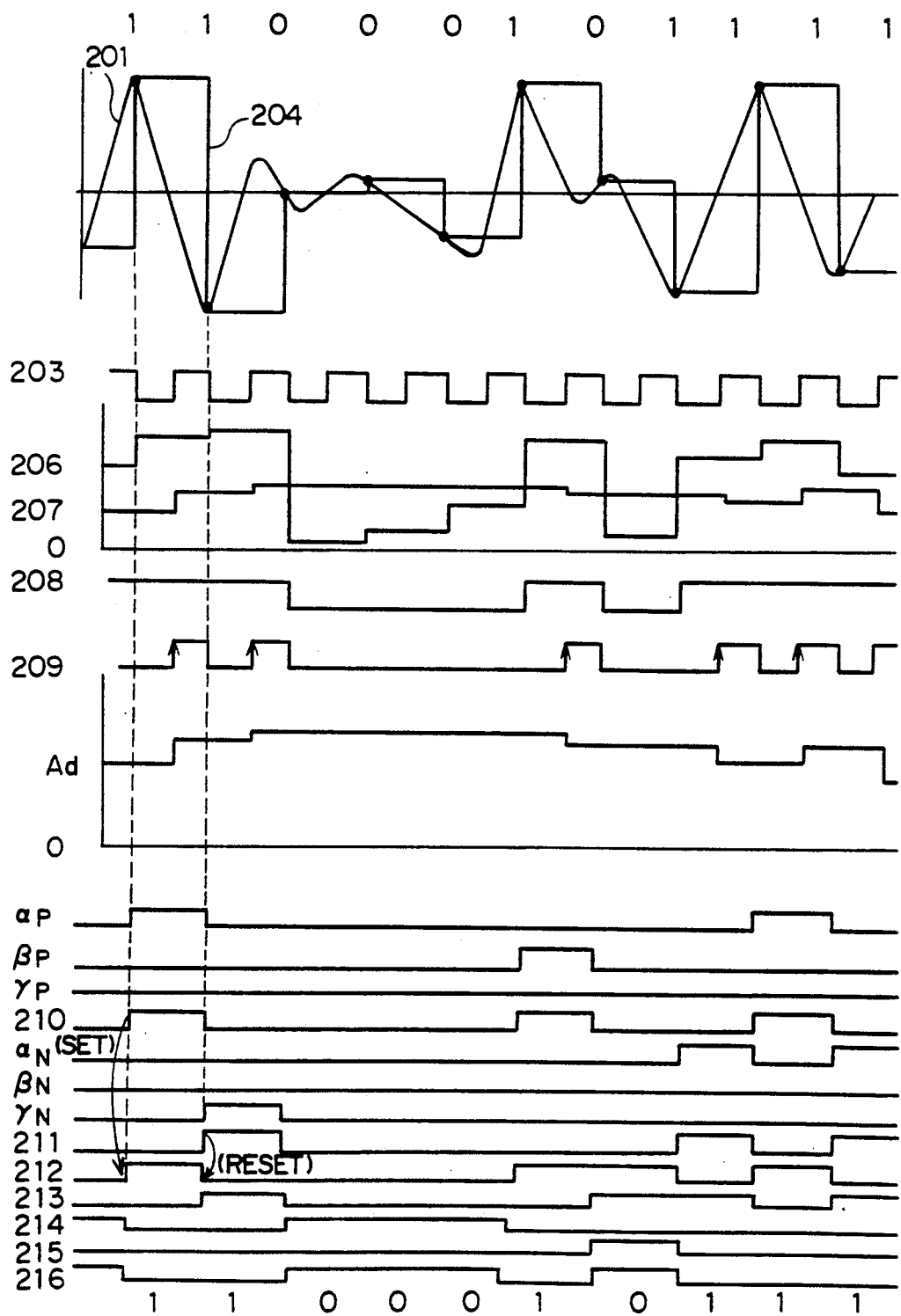
FIG. 3 shows a time chart of an operation of the embodiment of FIG. 1.

FIG. 3 shows a positive signal detection algorithm which uses a (0, 3) run-length code. The (0, 3) run-length code can assume only four patterns, "11", "101", "1001" and "10001". Status transition of those four patterns is shown in grid charts of FIGS. 2A to 2D. State 0 represents expectation of a positive signal detection, and state 1 represents expectation of a negative signal detection. Symbols Ad, 0 shown along paths indicate outputs when the transitions occurs along the paths.

Assuming that the output status at a time $(n-1)$ is state 0, as shown in FIG. 2A, there are two partial paths P1 and P2 which merge at a reproducing time $(n+1)$. The first partial path P1 has no "1" at the time n or $(n+1)$. The second partial path P2 has positive "1" at the time n and negative "1" at the time $(n+1)$. A most desirable path for the detection of the positive "1" at the time $(n+1)$ is one which has a small minimum square error. If the second partial path P2 is likely to occur, the following relation is met from a grid chart shown in FIG. 2A.

$$(V(n)-Ad)^2+(V(n+1)+Ad)^2 \leq (V(n)-0)^2+(V(n+1)-0)^2$$

Thus, $$V(n)-Ad \geq V(n+1) \qquad (1)$$

In the formula (1), if there is positive "1" at the time n and there is negative "1" at the time $(n+1)$, the first partial path P1 has no possibility of establishment and it is rejected. The remaining second path P2 is determined as a correct path. Thus, "1" is establsihed for the time n.

In FIG. 2B, like in FIG. 2A, there are three partial paths P3, P4 and P5 which are state "0" at the time $(n-1)$ and merges to the state 0 again at the time $(n+1)$. The first partial path P3 has no positive "1" at the times n, $(n+1)$ and $(n+2)$, the second partial path has "0" at the time n and "1" at the time $(n+1)$, and the third partial path P3 has "1" at the time n. In the grid chart, the following relation is met from the first and third partial paths P3 and P5.

$$V(n)-Ad \geq V(n+2)$$

For the second partial path P4, the following relation is met.

$$V(n) > V(n+1)$$

If a relation shown by a formula (2) in which the above two formulas are simultaneously met is met, "1" is established at the time n.

$$V(n)>V(n+1) \text{ and } V(n)-Ad \geq V(n+2) \qquad (2)$$

Similarly, in FIG. 2C, there are four partial paths P6, P7, P8 and P9 which merge at the time $(n+3)$. As shown in the partial path P9, if there is negative "1" at the time $(n+3)$ and there are "0" at the times $(n+1)$ and $(n+2)$, the following relation is met.

$$V(n)-A \geq V(n+3)$$

In the partical paths P7 and P8, the following relation is met.

$$V(n)>V(n+1) \text{ and } V(n)>V(n+2)$$

Accordingly, if the following formula (3) in which the above two formulas are simultaneously met is met, "1" is established at the time n.

$$V(n)>V(n+1) \text{ and } V(n)>V(n+2) \text{ and } V(n)-Ad>V(n+3) \qquad (3)$$

In FIG. 2D, the following relation is met.

$$V(n) > V(n+1) \text{ and } V(n) > V(n+2) \text{ and}$$
$$V(n) > V(n+3) \text{ and } V(n) - Ad \geq V(n+4) \quad (4)$$

In a similar logic, the detection algorithm for the negative "1" is derived as follows.

$$V(n) + Ad \leq V(n+1) \quad (5)$$

$$V(n) < V(n+1) \text{ and } V(n) + Ad \leq V(n+2) \quad (6)$$

$$V(n) < V(n+1) \text{ and } V(n) + < V(n+2) \text{ and}$$
$$V(n) + Ad \leq V(n+3) \quad (7)$$

$$V(n) < V(n+1) \text{ and } V(n) + < V(n+2) \text{ and}$$
$$V(n) < V(n+3) \text{ and } V(n) - Ad \leq V(n+4) \quad (8)$$

In the signal detection of the present invention, the formulas (1) to (4) are used for the positive detection logical expressions, and the formulas (5) to (8) are used for the negative detection logical expressions. The signal is determined in the following manner. A signal data at time (n) is determined as a theoretical value "1" if a sampled value of the read signal meets the logical expressions (1) to (4) when the positive peak is searched, or meets the logical expressions (5) to (8) when the negative peak is searched. A signal data at time (n) is determined as a theoretical value "0" if the logical expressions (1) to (4) are not met when the positive peak is searched or the logical expressions (5) to (8) are not met when the negative peak is searched. The logic applies a polarity alternation requirement to the read signal.

Figure 1:
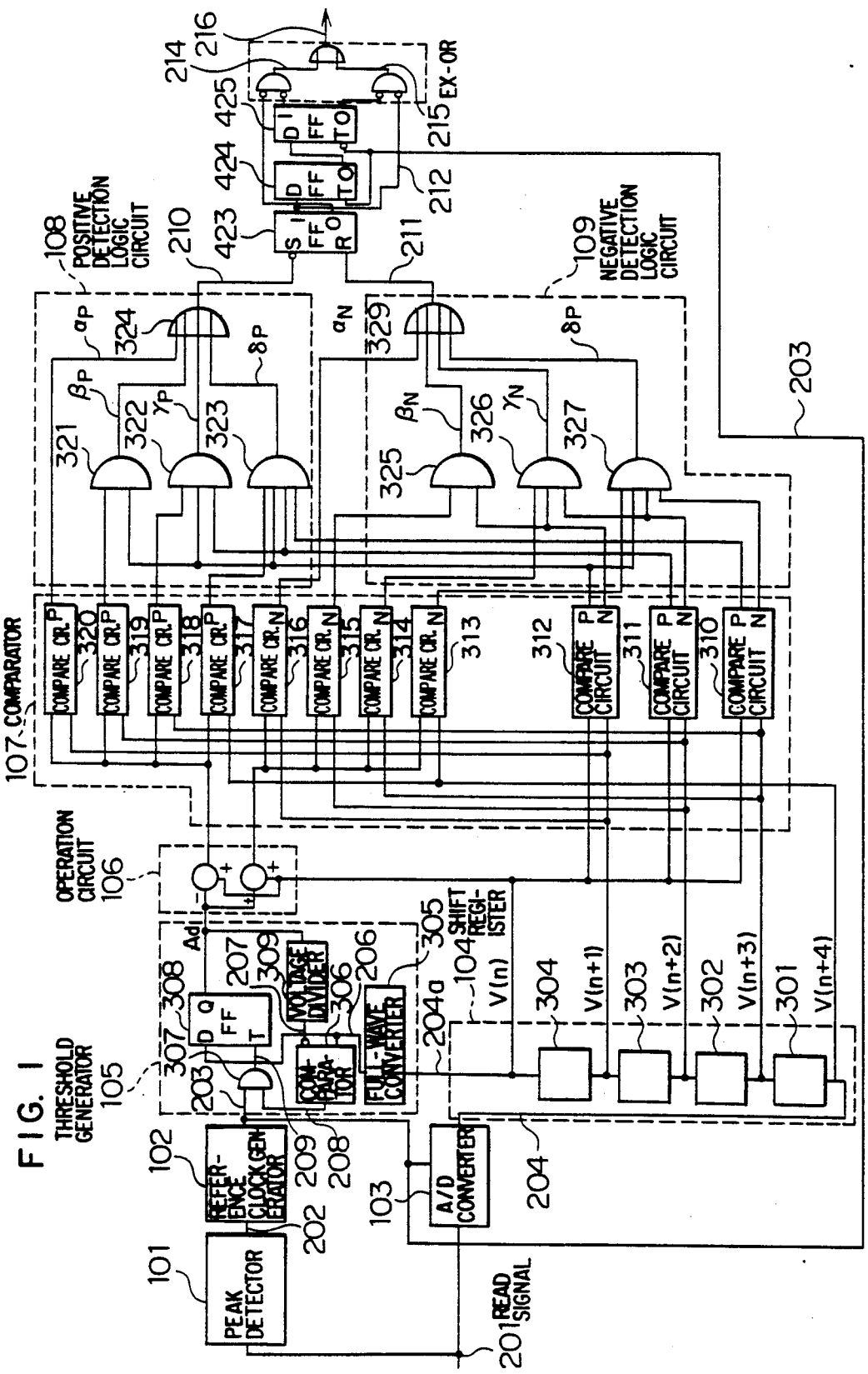
FIG. 1 shows a block diagram of one embodiment of the present invention.

FIG. 1 shows a circuit diagram for detecting digital data from a recording medium in accordance with one embodiment of the present invention, and FIG. 3 shows a time chart of an operation thereof. In FIGS. 1 and 3, a read signal 201 read from a recording medium through a pickup head is supplied, in a form of analog signal, to a peak detection circuit 101 and an analog/-digital (A/D) converter 103 through an automatic gain control circuit (not shown). The peak detection circuit 101 receives the read signal 201 and produces peak data 202 of the read signal 201. The peak data 202 is supplied to a reference clock generator 102. The reference clock generator 102 generates a clock signal 203 having a phase thereof synchronized with the peak data 202. The A/D converter 103 samples the read signal 201 by the clock signal 203 and generates a quantized digital signal 204. The quantized digital signal 204 is supplied to a reference A generator (detection threshold generator) 105, an operation circuit 106 and compare circuits 310, 311 and 312 in a comparator 107, through a cascade-connected 5-stage shift register 104.

The reference A generator 105 receives a quantized digital signal 204a from the shift register 104. A full-wave converter 305 converts the quantized digital signal 204a to a full-wave rectified waveform 206 around a center level of the quantized digital signal 204a, and supplies it to one input terminal of a comparator 306 and a D-type flip-flop 308. An output A of the flip-flop 308 is supplied to the comparator 306 through a voltage divider 309. The voltage divider 309 may comprise a division circuit. The voltage divider 309 divides the voltage of the output A by a factor n to produce an output 207 and supplies it to the other input terminals of the comparator 306. As described above, the full-wave waveform 206 from the full-wave converter 305 is applied to the one input terminal of the comparator 306. Accordingly, when the full-wave waveform 206 exceeds the output 207 of the voltage divider 309, the comparator 306 produces a logical level "H" at an output 208. The output 208, together with the clock signal 203, are supplied to an AND gate 307. If the output 208 of the comparator 306 is "H", the flip-flop 308 takes in the full-wave rectified waveform 206 supplied from the full-wave converter 305 and outputs a reference voltage A. The function of the above circuit is to hold the quantized digital 204 as the reference A only if the quantized digital signal 204 is not "0" but "1", so that the generation of the reference A follows a change in the peak level of the partial response signal during the detection of the data "1". Accordingly, the reference voltage A has a voltage level which follows the magnitude of the change in the level of the digital data "1" in the partial response signal.

The operation circuit 106 receives the reference voltage A and the quantized digital signal $V(n)$ at the time n to produce $(V(n)-A)$ and $(V(n)+A)$. The signal $(V(n)-A)$ is supplied to first input terminals of compare circuits 317, 318, 319 and 320, and the signal $(V(n)+A)$ is supplied to first input terminals of compare circuits 313, 314, 315 and 316. The quantized digital signal $V(n+1)$ at the time $(n+1)$ is supplied to the other input terminal of the compare circuit 320, which produces the "H" level at output $\alpha_p$ when the formula (1) is met, and it is supplied to an OR circuit 324 of a positive detection logic circuit 108. When the output $\alpha_p$ is "H", the first "1" of the positive "11" pattern data of the (0, 3) run-length code is detected.

The quantized digital signal $V(n+2)$ at the time $(n+2)$ is supplied to the other input terminal of the compare circuit 319. The output of the compare circuit 319 at the "H" level when $V(n)-Ad \geq V(n+2)$ is met, and it is supplied to an AND gate 321. Quantized digital signals $V(n)$ at the time (n) and $V(n+1)$ at the time $(n+1)$ are applied to two input terminals of a compare circuit 312, respectively. An output of compare circuit 312 is "H" when $V(n) > V(n+1)$ is met and is supplied to AND circuits 321, 322, 323 and 327. A logical expression of the output $\beta_p$ of the AND circuit 321 is given by the formula (2). When the formula (2) is met, the first data "1" of the positive "101" pattern is detected.

Quantized digital signal $V(n+2)$ at the time $(n+2)$ is supplied to the other input terminal of each of the compare circuits 311, 315 and 319 and the quantized digital signal $V(n+3)$ at the time $(n+3)$ is supplied to the other input terminal of each of the compare circuits 310 314 and 318. Quantized digital signal $V(n+4)$ at the time $(n+4)$ is supplied to the other input terminal of each of the compare circuits 313 and 317. Accordingly, the output P of the compare circuit 318 is "H" when $V(n)-Ad > V(n+3)$ is met and it is supplied to the first input terminal of the compare circuit 322. The output P of the compare circuit 311 is "H" when $V(n) > V(n+2)$ is met, and it is supplied to the third input terminals of the AND circuits 322 and 323. The output P of the compare circuit 310 is "H" when $V(n) > V(n+3)$ is met, and it is supplied to the fourth input terminal of the AND circuit 323. Accordingly, the output P of the compare circuit 317 is "H" when $V(n)-Ad > V(n+4)$ is met and is then supplied to the first input terminal of AND circuit 323. The logical expression of the output $\gamma_p$ of the AND circuit 322 is given by the formula (3). When the formula (3) is met, the first data "1" of the positive "1001" pattern is detected.

Similarly, a logical expression of an output $\delta_p$ of the AND circuit 323 is given by the formula (4). When the formula (4) is met, the first data "1" of the positive "10001" pattern is detected.

Like $\alpha_p$, $\beta_p$, $\gamma_p$ and $\delta_p$ in the positive detection logic circuit 108, $\alpha_N$, $\beta_N$, $\gamma_N$ and $\delta_N$ in a negative detection logic circuit 109 which comprises an OR circuit 329 and AND circuits 325, 326 and 327 assume the following logic. Namely, $\alpha_N$ is "H" when the formula (5) is met, $\beta_N$ is "H" when the formula (7) is met, and $\delta_N$ is "H" when the formula (8) is met.

In FIG. 1, a flip-flop 423 is set when the output 210 of the positive signal detection logic circuit 108 is "H" and reset when the output 211 of the negative signal detection logic circuit 109 is "H" to produce an output 212. Accordingly, if set or reset signals are consecutively issued to the flip-flop 423, the second and subsequent signals are effectively neglected. The output 212 is delayed by one clock period of the clock 203 by the flip-flops 424 and 425 to produce an output 213. The outputs 212 and 213 are exclusively ORed to produce read data 216 which is coincident to the record data.

Figure 4:
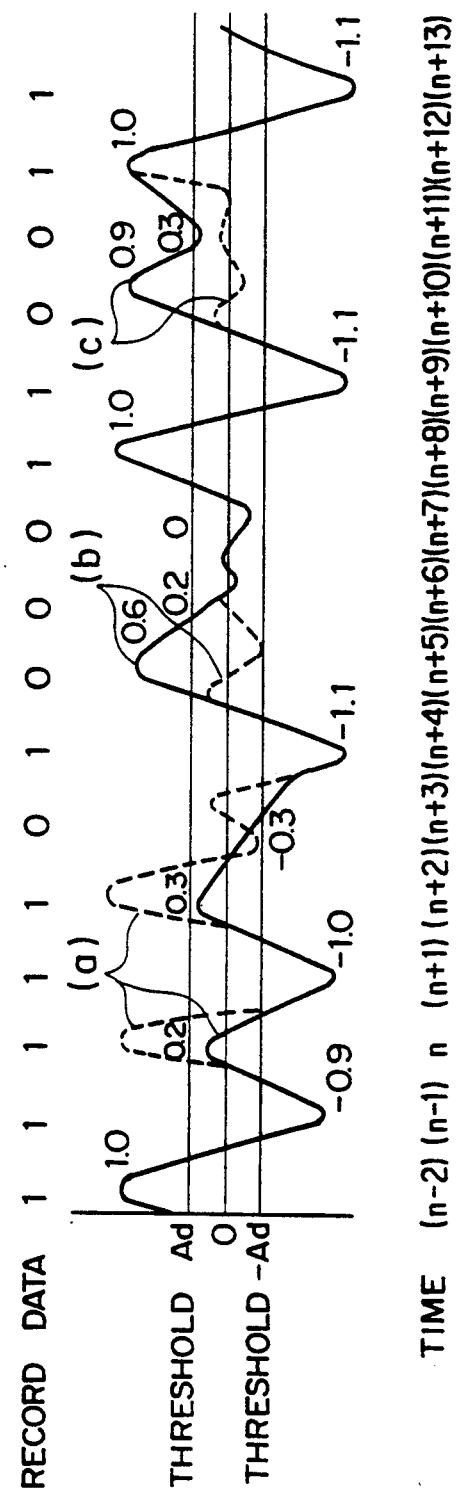
FIG. 4 shows a waveform of a reproduced waveform which includes pseudo peaks due to a medium defect or noise and effective peaks which do not reach a threshold level.

In the present embodiment, the data "1" is detected when one set of the equations (1) to (4) and (5) to (8) derived from the grid charts of the patterns of the (0, 3) run-length code are met, and the data "0" is detected when they are not met. For example, in the reproduced waveform of the "11" pattern at the time n in FIG. 4, the theoretical amplitudes at the times (n−1), n, (n+1) and (n+2) are −1, 1, −1 and 1, but the actual sampled values of the waveform are −0.9, 0.2, −1.0 and 0.3. In order to determine the time n for the "11" pattern, assuming A=0.85, the formula (1) is represented as $$0.2 - 0.85 \geq -1.0$$

Thus, the relation of the formula (1) is met and the bit at the time n is determined as the positive "1", and the correct data is read. In this manner, in the present embodiment, if the sample value at the time (n+1) has been "1", the correct data is read so long as the positive amplitude at the time n is no larger than −0.15. Similarly, in the "101" pattern waveform at the time (n+2) in FIG. 4, the sampled values are −1.0, 0.3, −0.3 and −1.1 while the theoretical amplitudes are −1, 1, 0 and −1. In this reproduced waveform, the relation of the formula (2) is met and the bit at the time (n+2) is determined as the positive "1" and the correct data is read. Finally, in the "10001" pattern waveform at the time (n+5) and "1001" pattern waveform at the time (n+10), the sampled values are −1.1, 0.6, 0.1, −0.1 and 1.0, and −1.1, 0.9, 0.3 and 1.0. In this case, since the formula (1) to (4) are not met, the bits at the times (n+5) and (n+10) are determined as "0". In the signal detection circuit of the present embodiment, the signal which has not been discriminated in the prior art system because of the medium defect or the noise can be correctly detected.

The signal detection algorithm used in the present invention may be expended to other (d, k) code. For example, in a 1±07 modulation system and a 2±07 modulation system, the number n of stages of the shift register is selected to meet n=k based on the (d, k) run-length code, and the grid chart used for the (0, 3) code may be developed in accordance with the particular pattern of the modulation system.

In the above embodiment, the full-wave waveform 206 of the full-wave converter 305 and the output 207 derived by dividing the current reference voltage A by n by the voltage divider 309 are used to generate the reference voltage A, although the output may be varied by varying the division factor n.

In the present embodiment, the error-free signal detection ability is maintained even when the pseudo peak generated by the noise or the undershoot in the reproduced waveform of the high density recorded signal or the medium defect substantially exceeds the threshold level or even when the effective peak does not exceed the threshold level.

Since the components are logic circuits, they can be integrated at a high density and include small manufacturing variance among the components and small temperature depending. As a result the correct signal detection is assumed even if the quality of the signal is lowered by the reduction of the width of the signal track or the increase of the recording density.

Figure 5:
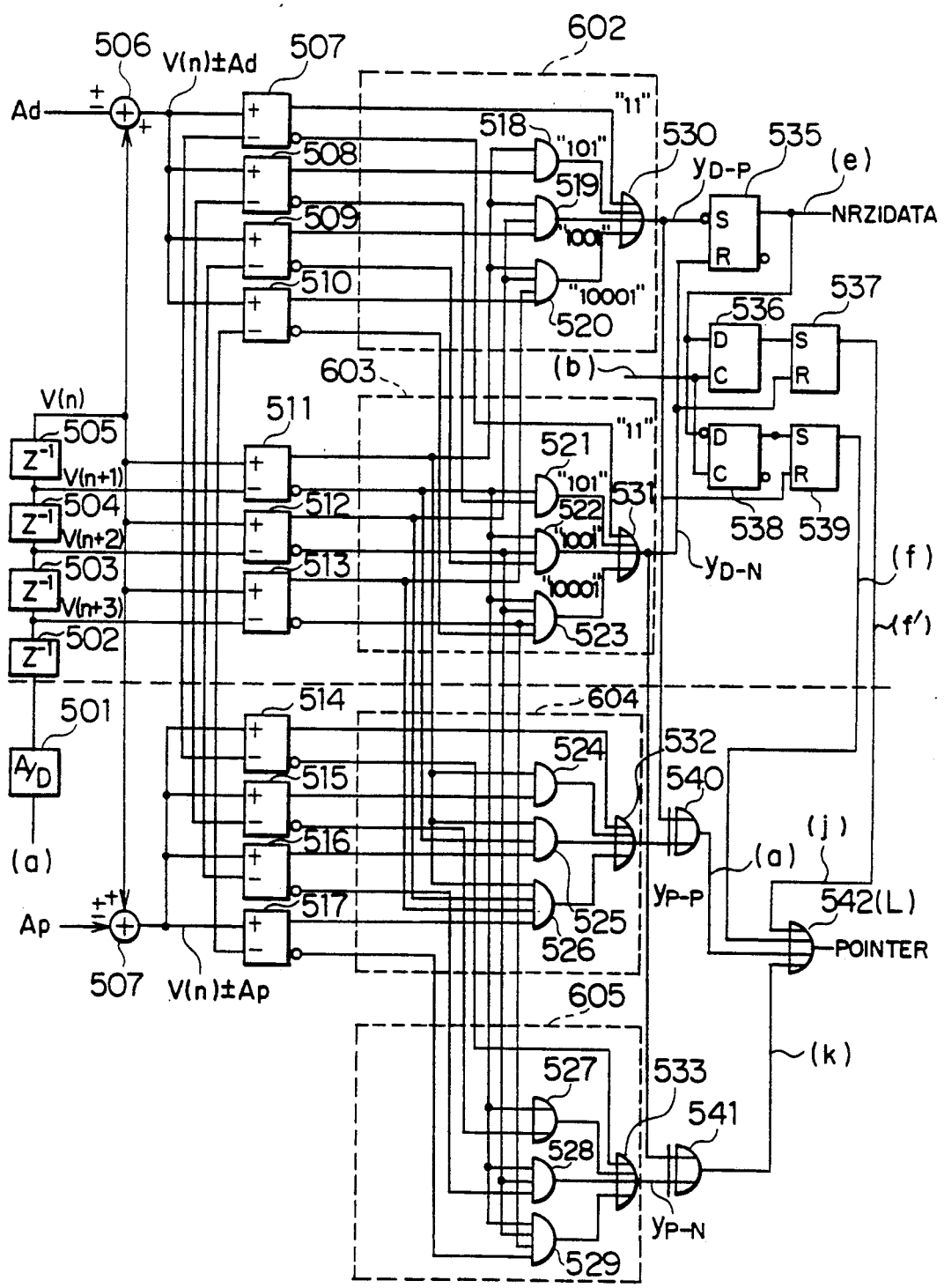
FIG. 5 shows a block diagram of another embodiment of the present invention.

Other embodiment of the present invention in which the error pointer detection is applied to the (0, 3) run-length code is now explained. FIG. 5 shows a block diagram of a data detection circuit and a pointer detection circuit of the present invention. FIGS. 6(a)–6(l) show a time chart for explaining an operation of the circuits. In FIG. 5, a reproduced analog signal is supplied to an A/D converter 501 which produces a quantized digital signal synchronized with peak positions of the reproduced analog signal and sampled by a reference clock signal (waveform b in FIG. 6), and it is supplied to cascade-connected shift registers 502 to 505 at the reference clock timing. An output V(n) of the shift register 505 is supplied to a data discrimination addition/subtraction circuit 506 and a pointer discrimination addition/subtraction circuit 507. The data and pointer discrimination addition/subtraction circuits 506 and 507 receive a quantized signal V(n) at the time of the determination of a predetermined level Ad or Ap and generate V(n)−Ad and V(n)−Ap when a positive signal is to be detected, and V(n)+Ad and V(n)+Ap when a negative signal is to be detected, and the positive slice level V(n)−Ad and the negative slice level V(n)+Ad to be used for the data are supplied to comparators 507 to 510. The positive slice level V(n)−Ap and the negative slice level V(n)+Ap to be used for the pointer are supplied to comparators 514 to 517. The comparator 507 compares V(n)−Ad and V(n+1), and if $$V(n) - A \geq V(n+1) \tag{9}$$

is met, YD changes to the H level through an OR circuit 530. An output YD-P of the OR circuit 530 is H when the following conditions are met by comparators 507 to 513 and a positive signal detection logic 602, and the output of the OR circuit 530 is L when the conditions are not met.

| Pattern | Positive pulse detection algorithm |
|---|---|
| 11: | V(n) Ad ≥ V(n + 1) |
| 101: | V(n) > V(n + 1) and V(n) − Ad ≥ V(n + 2) |
| 1001: | V(n) > V(n + 1) and V(n) > V(n + 2) and V(n) − Ad ≥ V(n + 3) |
| 10001: | V(n) > V(n + 1) and V(n) > V(n + 2) and V(n) > V(n + 3) and V(n) − Ad ≥ V(n + 4) |

For the negative signal detection, an output YD-N of an OR circuit 531 is H when the following conditions are met by the comparators 507 to 513 and a negative signal detection logic 603, and the output of the OR circuit 531 is L when they are not met.

| Pattern | Negative pulse detection algorithm |
|---|---|
| 1: | $V(n) + Ad \leq V(n + 1)$ |
| 101: | $V(n) < V(n + 1)$ and $V(n) - Ad \geq V(n + 2)$ |
| 1001: | $V(n) < V(n + 1)$ and $V(n) < V(n + 2)$ and $V(n) + Ad \leq V(n + 3)$ |
| 10001: | $V(n) < V(n + 1)$ and $V(n) > V(n + 2)$ and $V(n) < V(n + 3)$ and $V(n) + Ad \leq V(n + 4)$ |

The outputs YD-P and YD-N of the OR circuits 530 and 531 are supplied to a flip-flop 535, which is an R-S type flip-flop and reset by the output YD-P and set by the output YD-N. A demodulated NRZI signal is produced at an output of the flip-flop 535 (waveform e in FIG. 6). A flip-flop 536 counts the H ("1") level period of the NRZI data (e) by the reference clock (waveform b in FIG. 6) to monitor the "0" period restricted by the (d, k) run-length code. In the (0, 3) run-length code, the consecutive "0" is permitted up to three. Accordingly, if four or more "0" bits appear consecutively, an R-S type flip-flop 537 is set by the output of the flip-flop 536 and reset by the output of the OR circuit 531. The H level period in the output of flip-flop 537 is sent to an OR circuit 542 as a pointer signal (waveform f in FIG. 6). In FIG. 5, the positive signal pointer detection logic 604 and the negative signal pointer detection logic 605 are of the same signal detection algorithm as those of the positive and negative signal detection logics 602 and 603 except that Ap is higher than Ad in the positive signal pointer detection logic 604 and Ap is lower than Ad in the negative signal pointer detection logic 605. Numeral 540 denotes an exclusive OR circuit for the output YD-P of the positive signal detection logic and the output YP-P of the positive signal pointer detection logic, numeral 541 denotes an exclusive OR circuit for the output YD-N of the negative signal detection logic and the output YP-N of the negative signal pointer detection logic, and numeral 542 denotes an OR circuit for the outputs (waveforms f, f' in FIG. 6) of the S-R type flip-flops 537 and 539, and the outputs (waveforms h, j in FIG. 6) of the exclusive OR circuits 540 and 541. The output of the OR circuit 542 is the error pointer signal.

Figure 7:
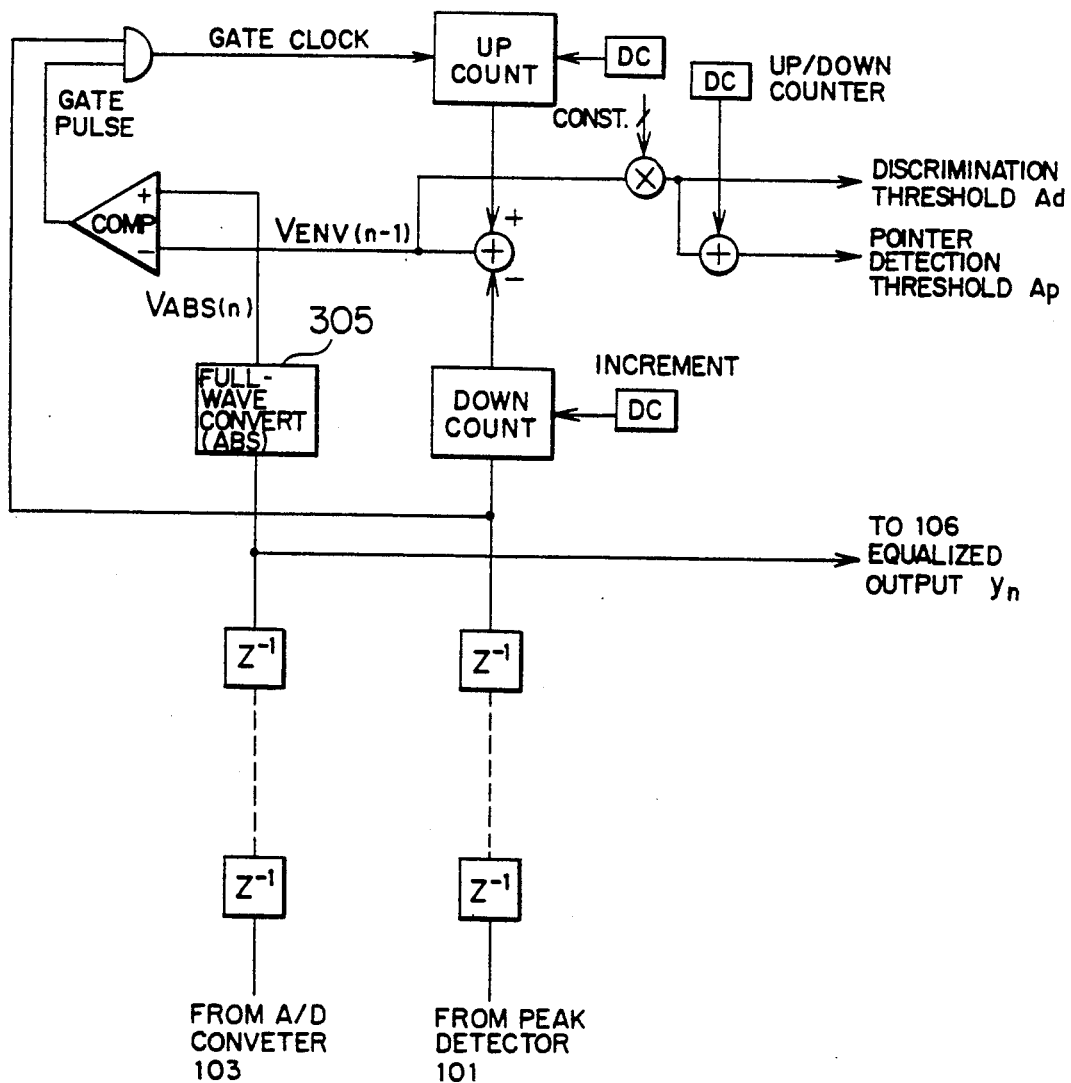
FIG. 7 shows a threshold generator used in the present invention.
Figure 8:
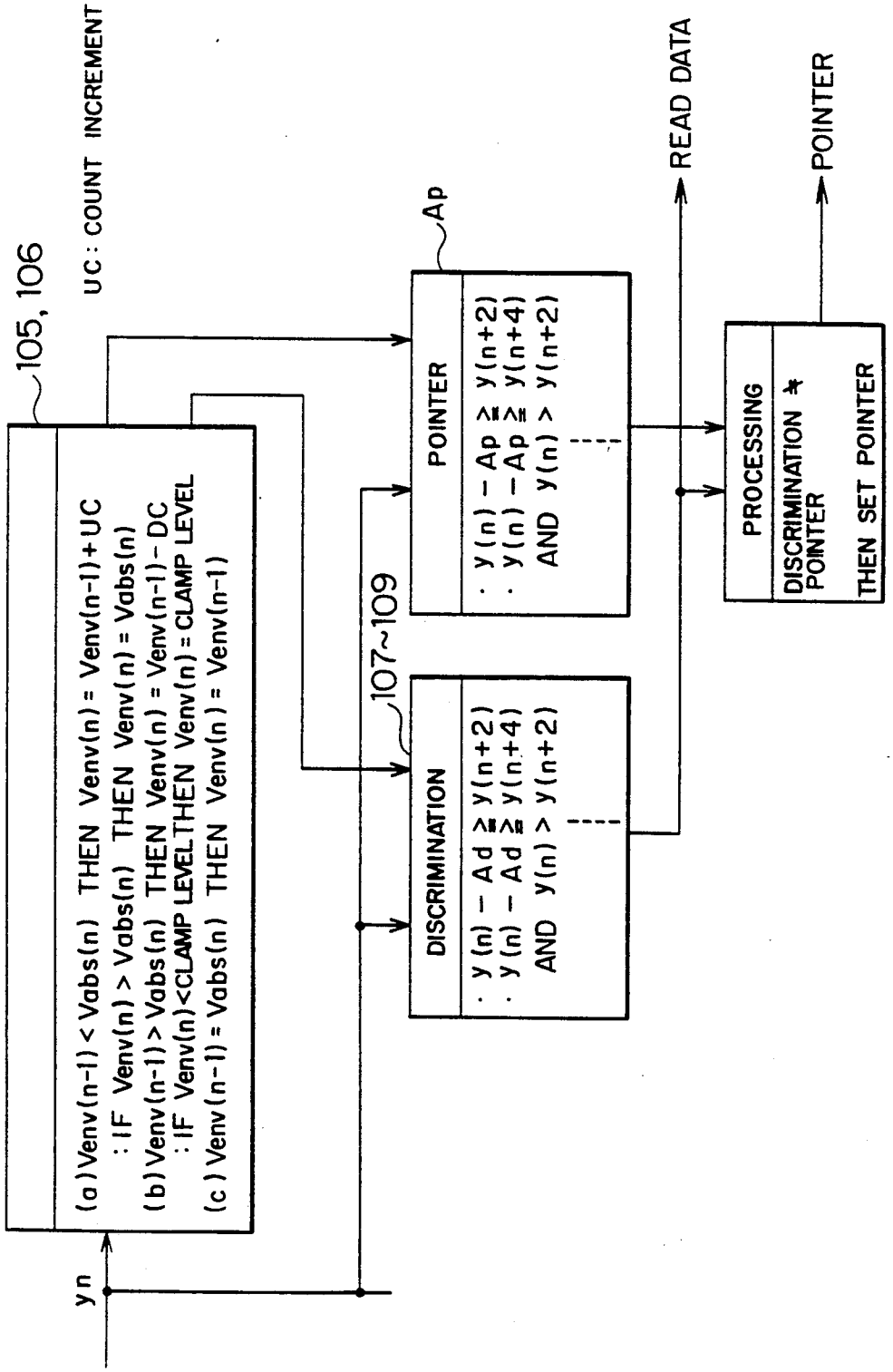
FIG. 8 shows logical operation steps of functions of a data detection circuit and an error pointer detection circuit of the present invention.

FIG. 7 shows a generator for generating the data discrimination threshold Ad and the pointer detection threshold Ap. FIG. 8 shows logical steps for the slice level generation, the data discrimination and the error pointer generation for an equivalent output Yn. The respective steps correspond to the functions of the blocks 105, 107–109, 540–542 and 604–605 in FIGS. 1 and 5.

Figure 6:
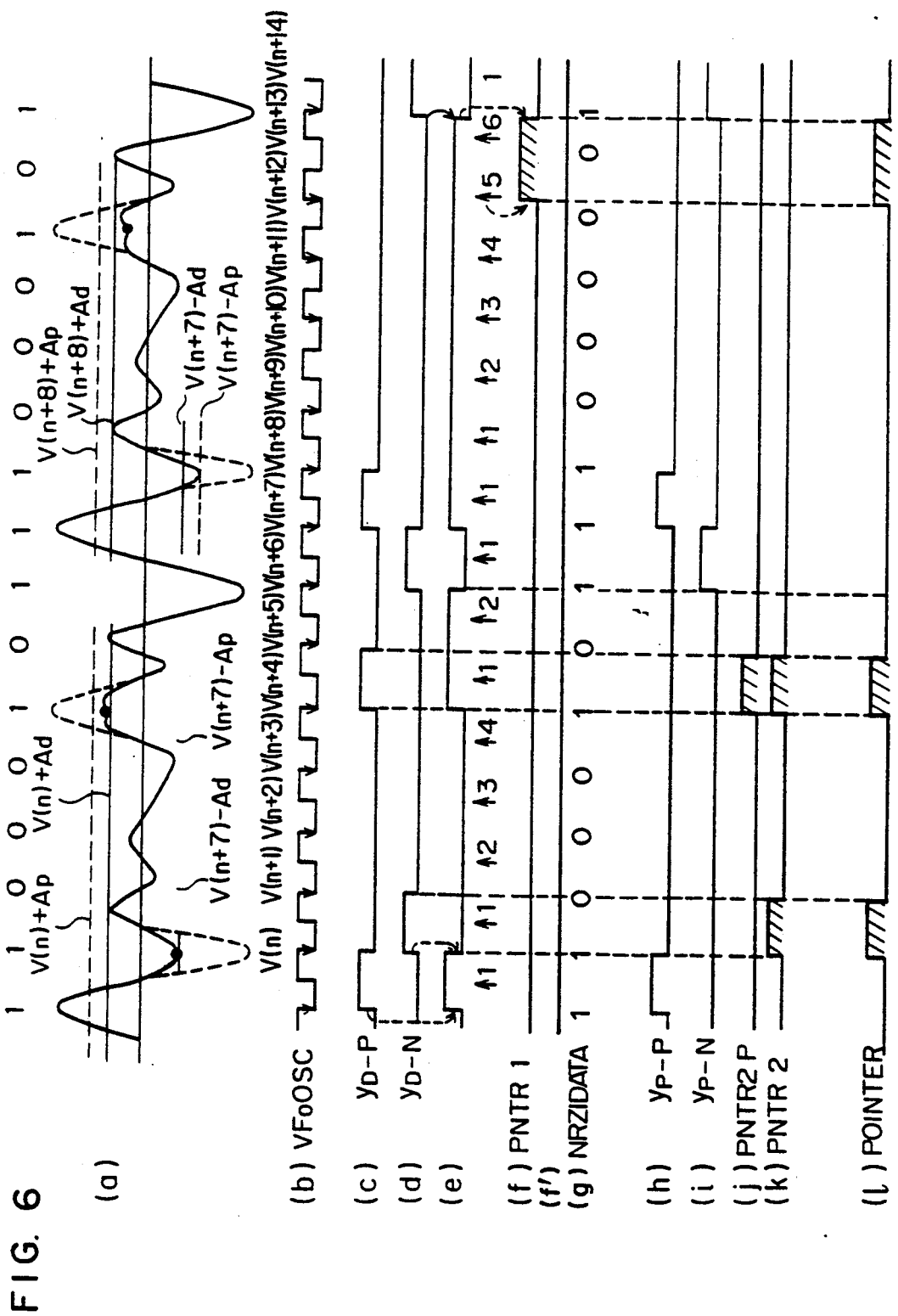
FIGS. 6(a)-6(l) show a time chart for explaining an operation of the embodiment of FIG. 5.

An operation of the embodiment shown in FIG. 5 is now explained with reference to a time chart of FIG. 6. The analog reproduced signal (waveform a in FIG. 6) is converted by the A/D converter 501 and the shift registers 502 to 505 to quantized time base signals V(n), V(n+1) V(n+2) and V(n+3), using the reference clock. The negative signal detection logic 603 compares the slice level V(n)+Ad which is the sum of V(n) and the discrimination level Ad and the quantized value of V(n+4), and produces a signal (waveform d in FIG. 6) by the condition of $V(n)<V(n+1)$ and $V(n)<V(n+2)$ and $V(n)<V(n+3)$. The positive signal detection logic 602 compares the slice level V(n+7)−Ad which is a difference between V(n+7) and the discrimination level Ad and the quantized value, and produces a signal (waveform c in FIG. 6). The flip-flop 535 is reset by the signal c and set by the signal d. The amplitude reduction signals V(n) and V(n+4) in FIG. 6 corresponding to noise are correctly detected, but the negative signal pointer detection circuit does not meet the condition of $V(n)+Ap \leq V(n+4)$ and an output i (waveform i in FIG. 6) is different from an output d (waveform d in FIG. 6). Thus, the exclusive OR circuit 540 produces PNTR[2] (waveform k in FIG. 6) which is outputted as an error pointer signal.

In accordance with the present embodiment, for the dropout or the data amplitude reduction due to the noise, the pointer generator monitors the relation of the outputs of the signal detection means and the pointer signal detection means, and for the misdiscriminated signal due to the strong dropout, the pointer which indicates the continuation of "0"s beyond the restriction by the (d, k) run-length code is generated. Accordingly, the correction capability of the error correction algorithm is expanded.

What is claimed is:

1. A signal detection circuit of a recording and reproducing apparatus for generating a clock signal synchronized with peaks of a reproduced signal read from a recording medium and determining "1" or "0" based on an absolute value of the peak of the reproduced waveform at a timing synchronized with the clock signal, comprising:

quantizing means for quantizing the reproduced signal in synchronism with the clock signal to produce a quantized signal;

a multi-stage shift register for delaying the quantized signal in synchronism with the clock signal;

reference signal generation means for comparing the quantized signal supplied from a final stage of the multi-stage shift register and a quantized signal representing a current reference, generating a predetermined value determined by the quantized signal supplied from the final stage of the shift register as a new reference when the quantized signal supplied from the final stage of the shift register is larger or smaller than the quantized signal representing the current reference, and maintaining the current reference when the quantized signal supplied from the final stage of the shift register is equal to the quantized signal representing the current reference;

operation means for adding the reference to the quantized signal supplied from the final stage of the shift register and subtracting the quantized signal supplied from the final stage of the shift register from the reference; and detection means for comparing the quantized signals supplied from the respective stages of the shift register with the added and subtracted quantized signals supplied from the operation means by a detection logic for data pattern "1" in accordance with a (d, k) run-length code, and detecting "1" by the detection logic for the data pattern "1" in accordance with the (d, k) run-length code based on the result of comparison.

2. A signal detection circuit according to claim 1 wherein said reference signal generation means compares the quantized signal supplied from the final stage of the shift register with 1/n of the quantized signal representing the current reference, generates the quantized signal supplied from the final stage of the shift register plus or less a predetermined value as a new reference when the quantized signal supplied from the final stage of the shift register is larger or smaller than the 1/n of the quantized signal representing the current reference, and maintaining the current reference when the quantized signal supplied from the final stage of the shift register is equal to the 1/n of the quantized signal representing the current reference.

3. A digital signal detection method in a recording and reproducing apparatus for generating a clock signal synchronized with peaks of a reproduced signal read from a recording medium and determining "1" or "0" with respect to a reference based on an absolute value of the peak of the reproduced waveform at a timing synchronized with the clock signal, comprising the steps of:

quantizing the reproduced signal in synchronism with the clock signal to produce a quantized signal;

delaying the quantized signal by a plurality of stages in synchronism with the clock signal;

comparing the quantized signal supplied from a final stage of the multi-stage delay and a quantized signal representing a current reference to generate a new reference in accordance with a difference between the quantized signal supplied from the final stage and the quantized signal representing the current reference;

adding the reference to the quantized signal supplied from the final stage of the shift delay and subtracting the quantized signal supplied from the final stage of the shift delay from the reference; and comparing the quantized signals supplied from the respective stages of the shift delay with the added and subtracted quantized signals supplied from the addition/subtraction step by a detection logic for data pattern "1" in accordance with a (d, k) run-length code, and detecting "1" by the detection logic for the data pattern "1" in accordance with the (d, k) run-length code based on the result of comparison.

4. A signal detection method according to claim 3 wherein said reference signal generation step compares the quantized signal supplied from the final stage of the shift delay with 1/n of the quantized signal representing the current reference, generates the quantized signal supplied from the final stage of the shift delay plus a predetermined value as a new reference when the quantized signal supplied from the final stage of the shift delay is different from the 1/n of the quantized signal representing the current reference, and maintaining the current reference when the quantized signal supplied from the final stage of the shift delay is equal to the 1/n of the quantized signal representing the current reference.

5. A signal detection circuit of a magnetic recording and reproducing apparatus for generating a clock signal synchronized with peaks of a reproduced signal read from a magnetic recording medium and determining "1" or "0" based on an absolute value of the peak of the reproduced waveform at a timing synchronized with the clock signal, comprising:

quantizing means for quantizing the reproduced signal in synchronism with the clock signal to produce a quantized signal;

a multi-stage shift register for delaying the quantized signal in synchronism with the clock signal;

reference signal generation means for comparing the quantized signal supplied from a final stage of the multi-stage shift register and a quantized signal representing a current reference, generating a predetermined value determined by the quantized signal supplied from the final stage of the shift register plus or minus a predetermined value, in proportion to a difference calculated in the comparison, as a new reference when the quantized signal supplied from the final stage of the shift register is larger or smaller than the quantized signal representing the current reference;

operation means for adding the reference to the quantized signal supplied from the final stage of the shift register and subtracting the quantized signal supplied from the final stage of the shift register from the reference; and detection means for comparing the quantized signals supplied from the respective stages of the shift register with the added and subtracted quantized signals supplied from the operation means by a detection logic for data pattern "1" in accordance with a (d, k) run-length code, and detecting "1" by the detection logic for the data pattern "1" in accordance with the (d, k) run-length code based on the result of comparison.

6. A signal detection circuit according to claim 5 wherein said reference signal generation means compares the quantized signal supplied from the final stage of the shift register with a product of the quantized signal representing the current reference and a predetermined coefficient, generates the quantized signal supplied from the final stage of the shift register plus or minus a predetermined value as a new reference when the quantized signal supplied from the final stage of the shift register is different from the product of the quantized signal representing the current reference and the coefficient, and maintaining the current reference when the quantized signal supplied from the final stage of the shift register is equal to the product of the quanitzed signal representing the current reference and the coefficient.

* * * * *

UNITED STATES PATENT AND TRADEMARK OFFICE
CERTIFICATE OF CORRECTION

PATENT NO. : 5,231,544
DATED : July 27, 1993
INVENTOR(S) : Hiromi Matsushige

It is certified that error appears in the above-indentified patent and that said Letters Patent is hereby corrected as shown below:

| Column | Line | |
|---|---|---|
| 1 | 24 | Change "Pulses" to --pulses-- |
| 2 | 3 | Delete "to". |
| 9 | 51 | Change "formula" to --formulas-- |

Signed and Sealed this

Twelfth Day of April, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO.    : 5,231,544
DATED         : July 27, 1993
INVENTOR(S)   : Hiromi Matsushige It is certified that error appears in the above-identified patent and that said Letters Patent is hereby corrected as shown below:

Column 1,
Line 24, change "Pulses" to -- pulses --

Column 2,
Line 3, Delete "to".

Column 9,
Line 51, Change "formula" to -- formulas --

Signed and Sealed this

Twenty-first Day of August, 2001

Attest:

*Nicholas P. Godici*

NICHOLAS P. GODICI
*Attesting Officer*    *Acting Director of the United States Patent and Trademark Office*